United States Patent
Rune et al.

(10) Patent No.: US 10,045,380 B2
(45) Date of Patent: Aug. 7, 2018

(54) METHOD AND APPARATUS FOR PROVIDING RANDOM ACCESS INFORMATION WHEN PAGING A WIRELESS DEVICE

(71) Applicant: Telefonaktiebolaget LM Ericsson (publ), Stockholm (SE)

(72) Inventors: Johan Rune, Lidingö (SE); Erik Eriksson, Linköping (SE)

(73) Assignee: TELEFONAKTIEBOLAGET LM ERICSSON (PUBL), Stockholm (SE)

(*) Notice: Subject to any disclaimer, the term of this patent is extended or adjusted under 35 U.S.C. 154(b) by 113 days.

(21) Appl. No.: 15/106,007

(22) PCT Filed: Dec. 19, 2013

(86) PCT No.: PCT/SE2013/051579
§ 371 (c)(1),
(2) Date: Jun. 17, 2016

(87) PCT Pub. No.: WO2015/094057
PCT Pub. Date: Jun. 25, 2015

(65) Prior Publication Data
US 2017/0034853 A1    Feb. 2, 2017

(51) Int. Cl.
*H04W 74/08* (2009.01)
*H04W 52/02* (2009.01)
(Continued)

(52) U.S. Cl.
CPC ......... *H04W 74/0833* (2013.01); *H04W 4/70* (2018.02); *H04W 52/02* (2013.01);
(Continued)

(58) Field of Classification Search
CPC . H04W 74/0833; H04W 4/005; H04W 52/02; H04W 52/0216; H04W 68/02; H04W 68/00; Y02B 60/50
See application file for complete search history.

(56) References Cited

U.S. PATENT DOCUMENTS

2012/0033613 A1* 2/2012 Lin ................... H04W 74/085
370/328
2012/0163311 A1   6/2012 Park
(Continued)

FOREIGN PATENT DOCUMENTS

| EP | 2369890 A1 | 9/2011 |
|---|---|---|
| EP | 2747508 A1 | 6/2014 |
| WO | 2013026374 A1 | 2/2013 |

OTHER PUBLICATIONS

3GPP, "3rd Generation Partnership Project; Technical Specification Group Core Network and Terminals; Non-Access-Stratum (NAS) protocol for Evolved Packet System (EPS); Stage 3 (Release 11)", 3GPP TS 24.301 V11.5.0 Dec. 2012, 1-344.
(Continued)

*Primary Examiner* — Jae Y Lee
(74) *Attorney, Agent, or Firm* — Sage Patent Group

(57) ABSTRACT

The present invention relates to a method for supporting random access (RA) of a wireless device. The method is performed in a radio network node of a wireless communication system. The radio network node serves a cell. The method comprises determining (610) whether to allocate a dedicated RA preamble to the wireless device at paging of the wireless device in the cell. When it is determined to allocate the dedicated RA preamble to the wireless device at paging, the method further comprises transmitting (620) an indicator of the dedicated RA preamble to the wireless device in a message related to the paging of the wireless device. The dedicated RA preamble is valid for RA during
(Continued)

a time window. Corresponding methods in the wireless device and in a core network node are also provided, as well as the nodes themselves.

24 Claims, 9 Drawing Sheets

(51) Int. Cl.
  *H04W 68/02* (2009.01)
  *H04W 4/70* (2018.01)
  *H04W 68/00* (2009.01)

(52) U.S. Cl.
  CPC ....... *H04W 52/0216* (2013.01); *H04W 68/02* (2013.01); *H04W 68/00* (2013.01); *Y02D 70/00* (2018.01); *Y02D 70/1242* (2018.01); *Y02D 70/1262* (2018.01); *Y02D 70/164* (2018.01); *Y02D 70/21* (2018.01)

(56) References Cited

U.S. PATENT DOCUMENTS

| | | | |
|---|---|---|---|
| 2012/0184306 A1* | 7/2012 | Zou | H04W 76/14 455/458 |
| 2012/0281679 A1 | 11/2012 | Fan et al. | |
| 2013/0015953 A1 | 1/2013 | Hsu et al. | |
| 2013/0021997 A1* | 1/2013 | Lee | H04W 74/0841 370/329 |
| 2013/0301591 A1* | 11/2013 | Meyer | H04W 74/0833 370/329 |
| 2014/0126460 A1* | 5/2014 | Bienas | H04W 74/002 370/315 |
| 2014/0233538 A1* | 8/2014 | Zhang | H04W 72/1205 370/336 |

OTHER PUBLICATIONS

3GPP, "3rd Generation Partnership Project; Technical Specification Group Radio Access Network; Evolved Universal Terrestrial Radio Access (E-UTRA); Radio Resource Control (RRC); Protocol specification (Release 11)", 3GPP TS 36.331 V11.2.0,Dec. 2012, 1-340.

3GPP, "3rd Generation Partnership Project; Technical Specification Group Radio Access Network; Evolved Universal Terrestrial Radio Access Network (E-UTRAN); X2 application protocol (X2AP) (Release 11)", 3GPP TS 36.423 V11.3.0, Dec. 2012, 1-141.

3GPP, "3rd Generation Partnership Project; Technical Specification Group Radio Access Network; Evolved Universal Terrestrial Radio Access (E-UTRA); Medium Access Control (MAC) protocol specification (Release 11)", 3GPP TS 36.321 V11.1.0, Dec. 2012, 1-57.

3GPP, "3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 8)", 3GPP TS 36.300 V.8.6.0, Sep. 2008, 1-137.

Unknown, Author, "RAN Mechanisms to Distribute RACH Intensity", 3GPP TSG RAN WG2 #69, R2-102297, Vodafone, San Francisco, USA, Jan. 22-26, 2010, pp. 1-8.

3GPP, "3rd Generation Partnership Project; Technical Specification Group Radio Access Network; Evolved Universal Terrestrial Radio Access Network (E-UTRAN); S1 Application Protocol (S1AP) (Release 11)", 3GPP TS 36.413 V11.2.1, Feb. 2013, pp. 1-272.

Wei, Chia-Hung et al., "Performance Analysis of Group Paging for Machine-type Communications in LTE Networks", IEEE Vehicular Technology Society, Mar. 7, 2013, pp. 3371-3382.

* cited by examiner

METHOD AND APPARATUS FOR PROVIDING RANDOM ACCESS INFORMATION WHEN PAGING A WIRELESS DEVICE

TECHNICAL FIELD

The disclosure relates to random access, and more specifically to a radio network node, a wireless device and a core network node, as well as to methods for supporting random access.

BACKGROUND

3GPP Long Term Evolution (LTE) is the fourth-generation mobile communication technologies standard developed within the $3^{rd}$ Generation Partnership Project (3GPP) to improve the Universal Mobile Telecommunication System (UMTS) standard to cope with future requirements in terms of improved services such as higher data rates, improved efficiency, and lowered costs. The Universal Terrestrial Radio Access Network (UTRAN) is the radio access network of a UMTS and Evolved UTRAN (E-UTRAN) is the radio access network of an LTE system. In an E-UTRAN, a User Equipment (UE) is wirelessly connected to a Radio Base Station (RBS) commonly referred to as an evolved NodeB (eNodeB) in LTE. An RBS is a general term for a radio network node capable of transmitting radio signals to a UE and receiving signals transmitted by a UE. The eNodeB is a logical node in LTE and the RBS is a typical example of a physical implementation of an eNodeB. A UE may more generally be referred to as a wireless device or a wireless terminal.

FIG. 1 illustrates a part of an LTE system. In the radio access network an eNodeB 101a serves a UE 103 located within the eNodeB's geographical area of service or the cell 105a. The eNodeB 101a is connected via an X2 interface to a neighboring eNodeB 101b serving another cell 105b. The two eNodeBs 101a and 101b are connected to a core network node called Mobility Management Entity (MME). The core network in LTE is sometimes referred to as Evolved Packet Core (EPC), and the MME is one of the core network nodes in EPC. Together, the E-UTRAN, the EPC and potentially other entities too, such as service related entities, are referred to as the Evolved Packet System (EPS). S1 Application Protocol (AP) provides the signaling service between E-UTRAN and the EPC. The Non-Access Stratum (NAS) protocol is used for the control signaling between the UE and the MME.

In a current vision of the future development of the communication in cellular networks, huge numbers of mostly small autonomous wireless devices become increasingly important. These devices are assumed not to be associated with humans, but are rather sensors or actuators of different kinds, which communicate with application servers within or outside the cellular network. The application servers configure the devices and receive data from them. Hence, this type of communication is often referred to as machine-to-machine (M2M) communication and the devices may be denoted machine devices (MDs). In the 3GPP standardization the corresponding alternative terms are machine type communication (MTC) and MTC devices. The MTC devices are a subset of the more general term UE. In terms of numbers, MTC devices will dominate over human users, but since many of them will communicate very scarcely, their part of the traffic volume will probably be small compared their part of the device population.

With the nature of MTC devices and their assumed typical usage follow that they will often have to be very energy efficient, since external power supplies will often not be available and since it is neither practically nor economically feasible to frequently replace or recharge their batteries. In some scenarios the MTC devices may not even be battery powered, but may instead rely on energy harvesting, i.e. gathering energy from the environment, opportunistically utilizing the often very limited energy that may be tapped from e.g. sun light, temperature gradients, and vibrations.

For such energy deprived devices the traffic is characterized by small, and more or less infrequent transactions that often are delay tolerant. As the transactions or communication events are infrequent, each of them will involve a process of establishing a connection to the network or—in case a connection can be maintained across multiple communication events—at least a Random Access (RA) procedure to synchronize the uplink, i.e. to acquire a valid timing advance. Hence, the behavior of these devices will result in a large, inevitably energy consuming signaling overhead.

Machine devices, however, consist of a very heterogeneous flora of devices and applications. Although the above described energy deprived devices, according to the vision, may constitute the largest part in terms of numbers, many other types of MTC devices and MTC applications are also envisioned and to some extent already existing. One example that has received quite a lot of attention is the development of power grids into so called "smart grids". This refers to the evolution of the conservative power grid technology into grids that are better adapted to the envisioned future requirements in the area of generation and distribution of electricity. The future requirements involve intermittent generation sources such as wind and solar power plants, many small generation sources such as from customers which sometimes produce more electricity than they consume, and a desire to impact the customers energy consumption habits to even out load peaks. In this evolution, information technology and in particular communication technology has an important role to play. In many smart grid applications, entities in the power grid, so-called substations (e.g. transformer stations) communicate with each other and with a control center for the purpose of automation and protection of equipment when faults occur. In contrast to the above described energy deprived devices with delay tolerant scarce communication, these smart grid applications often have extremely strict latency requirements, the amount of data communicated may range between small and large and the energy supply is typically not an issue. To make cellular communication technology a possible and attractive means of communication for such devices and applications, it is crucial to keep the delay associated with access and end-to-end communication as low as possible.

Although smart grid applications are prime examples of a MD application scenario that requires low access delay, they are not the only ones. MDs are also likely to find many applications in industrial processes, where they may serve purposes such as tuning the process and/or detecting and/or initiating automatic actions upon fault conditions. Also in the latter example, there may be many scenarios where extremely swift reactions are needed in order to avoid that expensive equipment is damaged or that costly restarts of complex processes are needed.

A property that such low delay applications share with the above described energy deprived MTC devices is that they require that the signaling overhead involved in network access is minimized. The current network access signaling procedure, focusing on the RA part, is described hereinafter.

If the concerned device is in RRC_IDLE state, the network access signaling involves a transition to RRC_CONNECTED state. In this case the network access control signaling consists of a RA phase for synchronizing with and gaining initial access to the cellular network and a further phase for authentication, configuring the connection, and establishing appropriate states on higher layers. The connection may e.g. be a Radio Resource Control (RRC) connection, and the establishing of appropriate states on higher layers may e.g. be done through S1AP signaling between the eNodeB and the MME, and NAS signaling between the UE and the MME in EPS. A first part of the network access signaling procedure, involving the RA procedure, is illustrated in the signaling diagram in FIG. 2.

The RA procedure consists of the first four messages S1-S4 of the procedure illustrated in FIG. 2. The RA messages pertain to the Medium Access Control (MAC) layer. In the case of transition from RRC_IDLE to RRC_CONNECTED state, as in FIG. 2, S3—RA Msg3 and S4—RA Msg4 also carry RRC layer messages between the UE and the eNodeB. The most elaborate of the RA messages is S2—RA Msg2, denoted RA Response (RAR). The format of the MAC Packet Data Unit (PDU) for a RAR (RAR PDU) is illustrated in FIG. 3 and FIG. 4.

In FIG. 3, BI is the optional Backoff Indicator, RAPID is the RA Preamble Identity (ID) indicating the RA preamble transmission that the corresponding MAC RAR pertains to, E is the Extension flag indicating whether there are more subheaders in the MAC header, T is the Type flag indicating whether the subheader comprises a BI or a RAPID, the two R fields in the optional BI subheader are reserved bits set to zero by the sending eNodeB and ignored by the receiving UE, and MAC RAR comprises the actual response information to the UE.

FIG. 4 illustrates the format of a MAC RAR, according to 3GPP TS 36.321, V11.1.0, section 6.1.5. The MAC RAR consists of four fields: a reserved bit R, a Timing Advance Command, an Uplink (UL) Grant, and a temporary Cell Radio Network Temporary Identifier (C-RNTI).

As can be seen from FIG. 2, the RA procedure in LTE consists of:

S1. RA Message 1 (Msg1): The UE 103 transmits a preamble on the Physical RA Channel (PRACH) to the eNodeB 101. Each cell has its own set of 64 RA preambles. However, preambles may be reused between non-neighbor cells. The preambles may optionally be divided into two groups, A and B. The UE then selects a group to randomly pick a preamble from, based on the potential message size and the channel quality. The potential message size is the size of the data available for transmission in message three of the RA procedure (S3. RA Message 3) plus the size of the MAC header and any possible MAC control elements. The channel quality is estimated in terms of the measured downlink (DL) path loss. Two conditions have to be met for the UE to select a preamble from preamble group B: the potential message size has to exceed a certain threshold and the estimated path loss has to be lower than a certain threshold.

S2. RA Message 2 (Msg2): The eNodeB 101 sends a RA Response (RAR) to the UE 103 using a broadcast identifier, RA Radio Network Temporary Identifier (RA-RNTI). As indicated in FIG. 3 the RAR PDU may contain a BI and zero or more MAC RAR. Each MAC RAR comprises a temporary C-RNTI (TC-RNTI), a timing advance command, an UL grant and a reserved bit, R, which is set to zero. The MAC PDU header comprises one MAC subheader, i.e. one RAPID subheader, for each MAC RAR that is included in the RAR PDU. Each such corresponding RAPID subheader includes a RA preamble ID which indicates the received RA preamble that the corresponding MAC RAR pertains to. Hence, in this way each MAC RAR is mapped to a preamble transmitted by the UE and received by the eNodeB in step S1, and to a PRACH (see FIG. 3 and FIG. 4).

S3. RA Message 3 (Msg3): The UE 103 transmits RA Msg3 to the eNodeB 101 using the UL transmission resources allocated by the UL grant in step S2. The message comprises the RRC layer message RRCConnectionRequest, which includes a UE identity which may be an S-Temporary Mobile Subscriber Identity (S-TMSI) or a random value. The UE identity is used for contention resolution, i.e. to resolve situations where two or more UEs simultaneously used the same preamble in step S1. Depending on the parameters in the UL grant received in step S2, this Msg3 is transmitted 6 or 7 subframes after the reception of the RAR (RA Msg2) in a Frequency Division Duplex (FDD) mode. In Time Division Duplex (TDD) mode the timing also depends on the configuration of UL and DL subframes.

S4. RA Message 4 (Msg4): To conclude the contention resolution, the eNodeB 101 echoes the UE identity received in RA Msg3 in a UE Contention Resolution Identity MAC Control Element in RA Msg4. RA Msg4 also carries the RRC layer message RRCConnectionSetup as a part of the RRC connection establishment. The UE "promotes" the TC-RNTI received in RA Msg2 to a regular C-RNTI.

The fifth message S5 is the RRCConnectionSetupComplete message from the UE 103 to the eNodeB 101. This message is not a part of the actual RA procedure although it is a part of the RRC connection establishment procedure. The RRCConnectionSetupComplete message also comprises the initial NAS message from the UE, forwarded to the MME in step S6.

The last message S6 illustrated in FIG. 2 is the S1AP Initial UE Message forwarded by the eNodeB 101 to the MME 102. This NAS message may be e.g. a Service Request as illustrated in FIG. 2. However, it may also be an Attach Request, or a Tracking Area Update Request message.

One common case where the RA procedure is used in conjunction with idle to connected mode transition is when the UE responds to a page from the network. To be reachable for paging, an idle UE has to monitor a certain repetitive DL signaling channel to check for paging indications directed towards it. In EPS this consists of monitoring the Physical DL Control Channel (PDCCH) for DL resource assignments—also called DL scheduling assignments—addressed to a Paging RNTI (P-RNTI). The P-RNTI is shared by many UEs, so when detecting such a paging indication, the UE has to receive the Paging RRC message, which is transmitted on the DL transmission resources on the Physical DL Shared Channel (PDSCH) that were assigned by the paging indication on the PDCCH. This Paging RRC message comprises the identity/identities of the UE(s) that the paging concerns and which is/are thus requested to contact the network. When finding its identity in a Paging RRC message, the UE initiates a RA procedure towards the eNodeB, establishes an RRC connection with the eNodeB and sends a Service Request NAS message to the MME.

Network access signaling comprising the RA procedure is involved also in the case where a UE that wants to transmit UL data is in RRC_CONNECTED state, but lacks UL synchronization, i.e. lacks a valid Timing Advance. A RA procedure will also be required even if a UE in RRC_CONNECTED state is synchronized with the UL, but has not been allocated any resources on the Physical UL Control Channel (PUCCH) for transmission of Scheduling Requests. The allocation of PUCCH resources is optional. This access signaling procedure is much briefer than during idle to connected mode transition. FIG. 5 illustrates the message sequence of the network access signaling involved when a UE in RRC_CONNECTED state that lacks a valid timing advance wants to transmit UL data in the FDD mode of EPS/LTE. Signaling in step S1 and S2 is the same as described above with reference to FIG. 2 during idle to connected mode transition. Whether the delay between step S2 and S7 is 6 or 7 subframes depends on the parameters of the UL grant in step S2. As previously mentioned, in TDD mode this delay also depends on the configuration of UL and DL subframes.

In step S7 of the message sequence of FIG. 5 the UE transmits UL data on the PUSCH utilizing the transmission resources allocated in step S2. This is opposed to the case of idle to connected mode transition where the UE transmits an RRCConnectionRequest message in step S3. Since the UE is in RRC_CONNECTED state, it already has a valid C-RNTI. The UE identifies itself in step S7 by including its C-RNTI in a C-RNTI MAC Control Element. If there is more room available in the allocated transmission resources, the UE may also include a Buffer Status Report (BSR) and/or user data according to the following rule: If all user data can be fit in the transport block, then inclusion of user data has priority over inclusion of a BSR, but if not all user data can be fit in the transport block, then the BSR has priority over the user data.

Step S8 is the contention resolution step, comprising an UL grant from the eNodeB 101 addressed to the C-RNTI transmitted from the UE in step S7.

If two or more UEs select and transmit the same preamble in the same subframe, they will listen to the same response message in step S2 and will thus attempt to transmit in step S7 using the same UL resources. This results in a RA collision and a contention situation. Such collisions cause transmission failures and in the worst case the eNodeB will not be able to successfully receive and decode any of the UEs' transmissions. A UE for which the contention resolution implies RA failure will reattempt the RA procedure, starting at step S1, possibly after a random backoff delay if a BI was included in the RA Response message in step S2.

A third variant of the RA procedure is used in conjunction with handover from one cell to another, e.g. between a source cell and a target cell belonging to two different eNodeBs. In this case the UE is allocated a dedicated, contention-free RA preamble prior to the execution of the handover. This is done in a mobilityControlInfo Information Element (IE) in an RRCConnectionReconfiguration message in the source cell. The dedicated, contention-free RA preamble is allocated by the target eNodeB and transferred to the source eNodeB before it is conveyed to the UE. The purpose of the subsequent RA procedure in the target cell is to acquire a timing advance in the new cell. Since the UE uses a dedicated, contention-free preamble, the risk for RA collisions is eliminated and the RA procedure may therefore be limited to the first two steps S1 and S2, i.e. RA Msg1 and RA Msg2.

As mentioned previously, it is of crucial importance for many MD applications that the network access control signaling is minimized. The problems caused by a large control signaling overhead include both energy consumption and access delay.

SUMMARY

It is therefore an object to address at least some of the problems outlined above, and to provide a solution for random access that reduces energy consumption and access delay. This object and others are achieved by the methods and the apparatus according to the independent claims, and by the embodiments according to the dependent claims.

In accordance with a first aspect, a method for supporting random access of a wireless device is provided. The method is performed in a radio network node of a wireless communication system. The radio network node serves a cell. The method comprises determining whether to allocate a dedicated random access preamble to the wireless device at paging of the wireless device in the cell. When it is determined to allocate the dedicated random access preamble to the wireless device at paging, the method further comprises transmitting an indicator of the dedicated random access preamble to the wireless device in a message related to the paging of the wireless device. The dedicated random access preamble is valid for random access during a time window.

In accordance with a second aspect, a method for random access performed in a wireless device is provided. The method comprises receiving from a radio network node of a wireless communication system, an indicator of a dedicated random access preamble in a message related to a paging of the wireless device in a cell served by the radio network node. The dedicated random access preamble is valid for random access during a time window. The method also comprises initiating a random access procedure with the radio network node using the dedicated random access preamble.

In accordance with a third aspect, a method for supporting random access of a wireless device is provided. The method is performed in a core network node of a wireless communication system. The core network node is connected to a radio network node serving a cell in which the wireless device is paged. The method comprises determining whether the wireless device is a candidate for using dedicated random access preambles. When the wireless device is a candidate, the method further comprises transmitting information to the radio network node indicating that the wireless device is a candidate for using dedicated random access preambles. The information is transmitted in a message related to the paging of the wireless device in the cell.

In accordance with a fourth aspect, a radio network node of a wireless communication system for supporting random access of a wireless device is provided. The radio network node is configured to serve a cell. The radio network node comprises processing means and a transmitter. The processing means is adapted to determine whether to allocate a dedicated random access preamble to the wireless device at paging of the wireless device in the cell. The processing means is also adapted to transmit an indicator of the dedicated random access preamble via the transmitter to the wireless device in a message related to the paging of the wireless device, when it is determined to allocate the dedicated random access preamble to the wireless device at paging. The dedicated random access preamble is valid for random access during a time window.

In accordance with a fifth aspect, a wireless device adapted for random access is provided. The wireless device comprises processing means and a receiver. The processing means is adapted to receive an indicator of a dedicated random access preamble via the receiver from a radio network node of a wireless communication system. The indicator is received in a message related to a paging of the wireless device in a cell served by the radio network node. The dedicated random access preamble is valid for random access during a time window. The processing means is also adapted to initiate a random access procedure with the radio network node using the dedicated random access preamble.

In accordance with a sixth aspect, a core network node of a wireless communication system for supporting random access of a wireless device is provided. The core network node is configured to be connected to a radio network node serving a cell in which the wireless device is paged. The core network node comprises processing means and communication means for communicating with the radio network node. The processing means is adapted to determine whether the wireless device is a candidate for using dedicated random access preambles. The processing means is also adapted to, when the wireless device is a candidate, transmit information via the communication means to the radio network node, in a message related to the paging of the wireless device in the cell. The information indicates that the wireless device is a candidate for using dedicated random access preambles.

An advantage of embodiments is that the risk for random access preamble collision for selected UEs is eliminated, thereby reducing the average energy consumption and network access delay for the UEs, which is particularly important for various MTC device applications.

Other objects, advantages and features of embodiments will be explained in the following detailed description when considered in conjunction with the accompanying drawings and claims.

DETAILED DESCRIPTION

Figure 1:
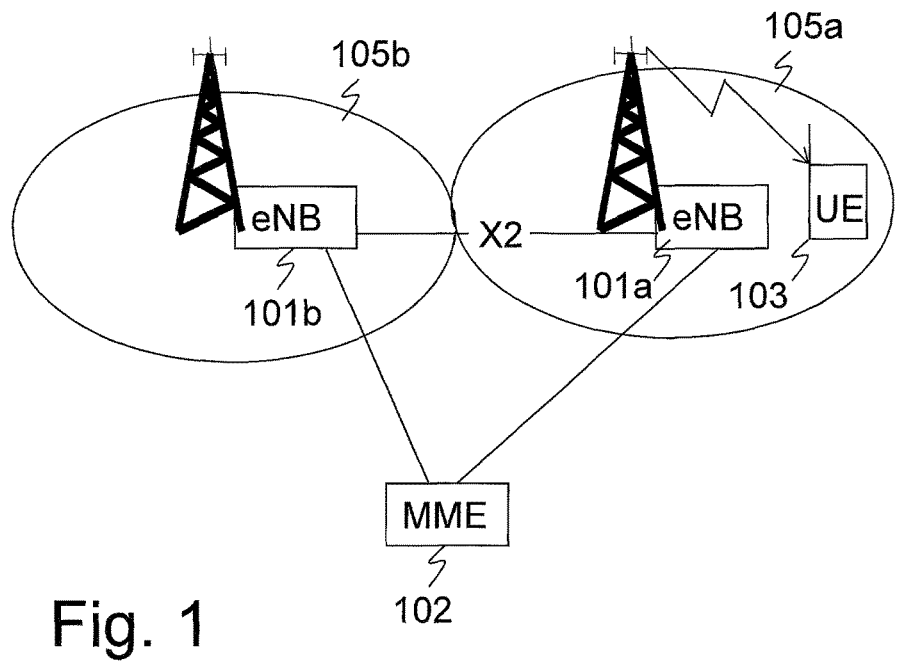
FIG. 1 is a schematic illustration of an LTE network.
Figure 4:
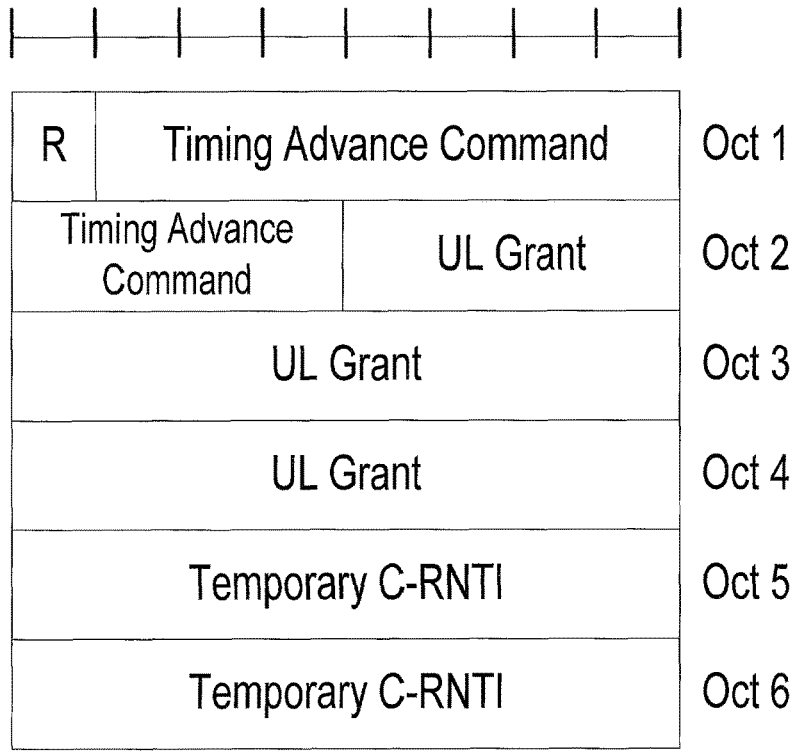
FIG. 4 is a block diagram schematically illustrating the format of a MAC RAR.
Figure 2:
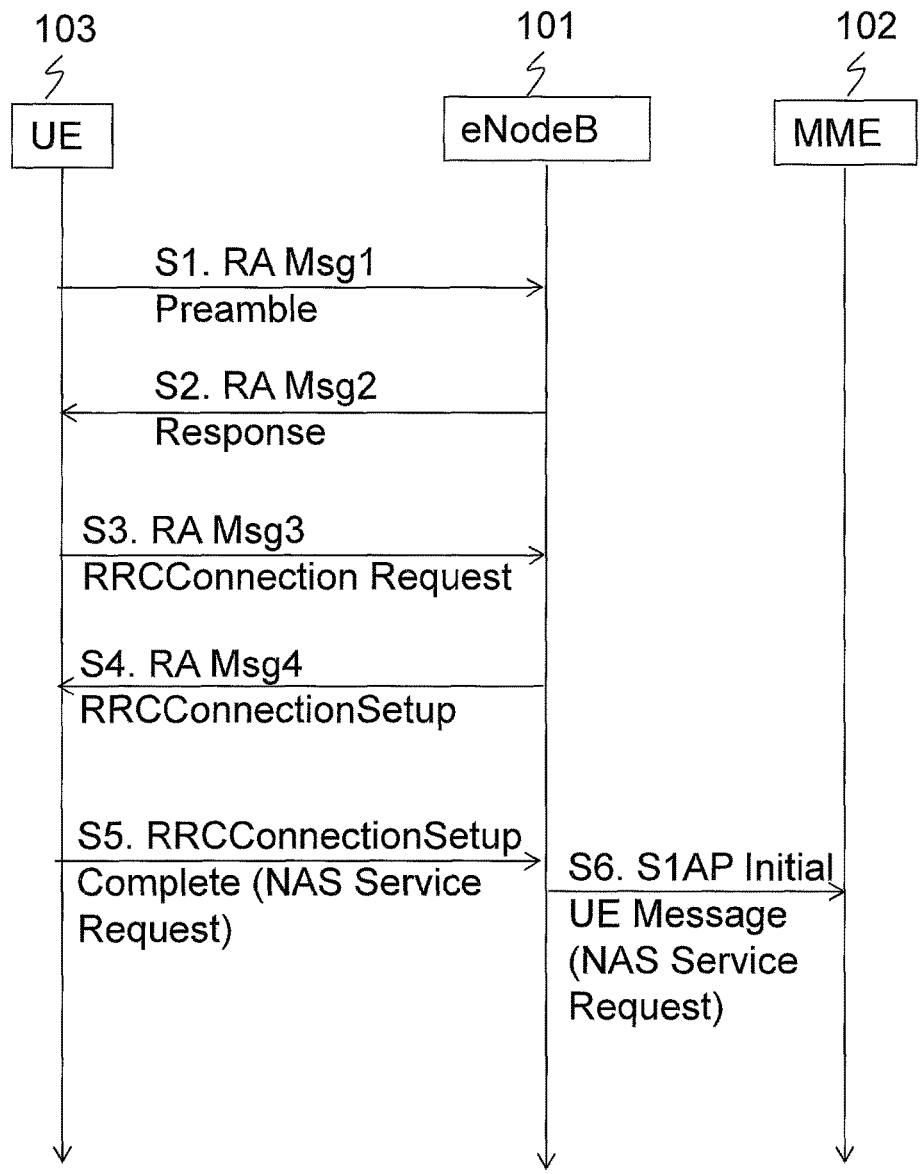
FIG. 2 is a signaling diagram illustrating the RA procedure and a first part of the RRC connection establishment procedure according to prior art.

In the following, different aspects will be described in more detail with references to certain embodiments and to accompanying drawings. For purposes of explanation and not limitation, specific details are set forth, such as particular scenarios and techniques, in order to provide a thorough understanding of the different embodiments. However, other embodiments that depart from these specific details may also exist.

Embodiments are described in a non-limiting general context in relation to an example scenario in an E-UTRAN, where a UE in idle mode is paged in a cell and initiates a RA procedure with an eNodeB serving the cell. However, it should be noted that the embodiments may be applied to any radio access network technology with paging and RA procedures similar to those in an E-UTRAN, such as in UTRAN.

Reducing the signaling overhead is important to facilitate for MD and MTC devices to efficiently function using a cellular network, as battery lifetime may be a scarce resource and energy harvesting conditions may be poor. Hence, the network access signaling and in particular the RA procedure is an important target for optimizations. The RA procedure is involved in the network access signaling for devices in both RRC_IDLE and RRC_CONNECTED state.

The problem of reducing signaling overhead during network access is addressed by a solution targeting the RA procedure. A problematic property of the RA procedure is the randomly occurring RA collisions. RA collisions are of course undesirable in general, e.g. because they reduce the system efficiency and have negative consequences for the involved UEs. For the previously described MDs in particular, the negative consequences include both increased energy consumption and increased access delay. When a UE reattempts the RA procedure after a failure caused by collision, there is of course no guarantee that the RA procedure will succeed the second time. Hence, through repeated collisions the access delay and signaling overhead are unbounded and may at least theoretically increase indefinitely.

To eliminate this risk, dedicated contention-free RA preambles may be used in a new way. Normally, such preambles are used only in conjunction with UE handovers, where the dedicated preamble is allocated to the UE by the target eNodeB via the source eNodeB, as described in the background section.

The RA preambles that are available in a cell are limited. Hence, to ensure that the preambles are not wasted, a short term allocation of dedicated, contention-free preambles to UEs on a per need basis is provided. The short term allocation allows for a frequent reuse of the preambles, such that numerous UEs may benefit from the feature, while avoiding that too many dedicated, contention-free preambles are used simultaneously.

Dedicated contention-free preambles are thus allocated with very short lease times on a per need basis. The need arises when a UE, preferably belonging to one of the target categories that achieves significant benefits from a dedicated contention-free preamble, is about to initiate a RA procedure. The one situation where the eNodeB knows that the UE is about to initiate a RA procedure is when the UE is paged in at least one of the cells of the eNodeB. Hence, the eNodeB may allocate a temporarily dedicated RA preamble to a paged UE to be used when the UE responds to the page. The eNodeB may allocate the dedicated preamble to the UE in a message related to the paging of the UE, as will be further described below. This allows the UE to use a contention-free random access procedure, which is certain to be collision-free and which may be faster since no contention resolution is needed. In such a contention-free initial random access procedure the RRCConnectionRequest message may for example be omitted in the transmission granted by the RAR. The entire transmission could otherwise be discarded and no grant would need to be transmitted in the RAR. The UE would hence directly promote the TC-RNTI in the RAR to its C-RNTI without waiting for contention resolution.

Allocation of Dedicated RA Preamble

Figure 3:
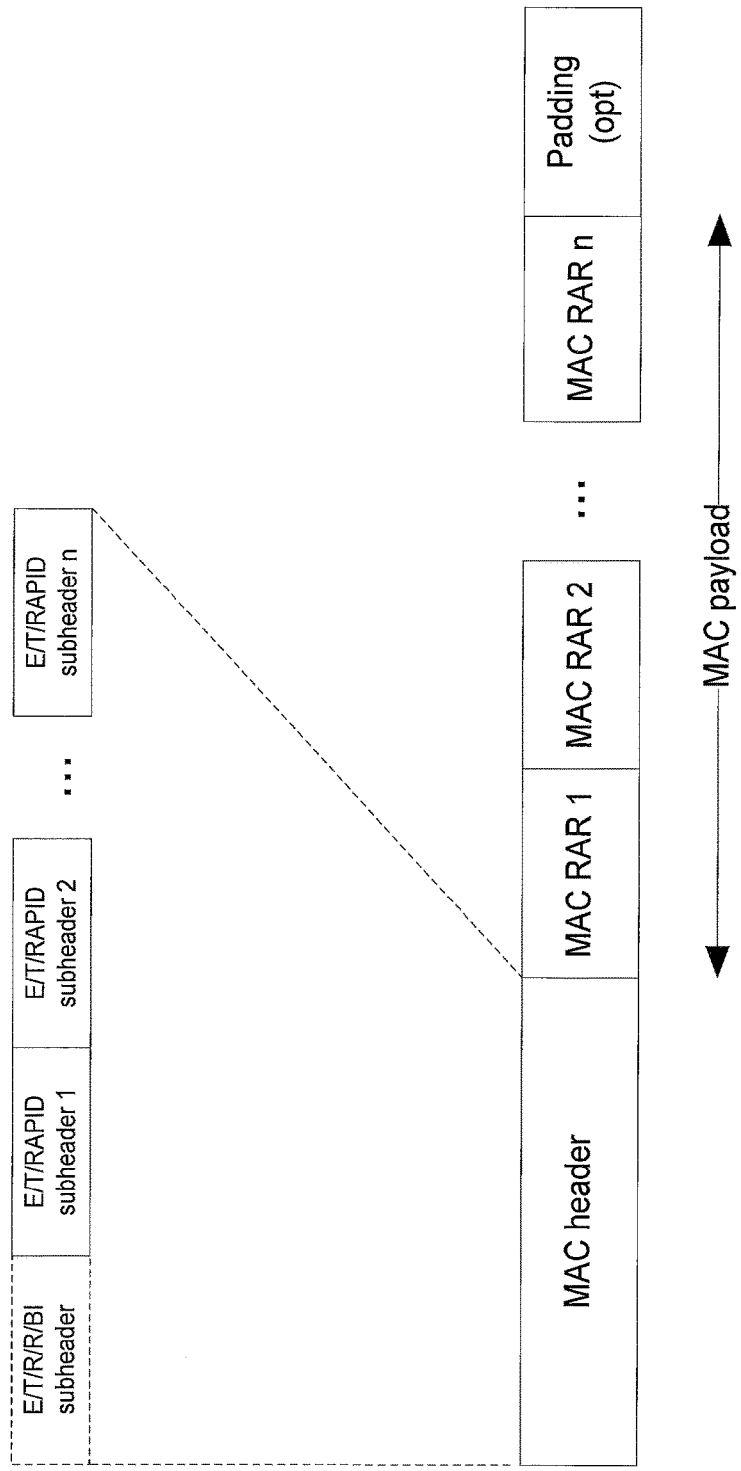
FIG. 3 is a block diagram schematically illustrating the format of the MAC PDU for a RAR.
Figure 5:
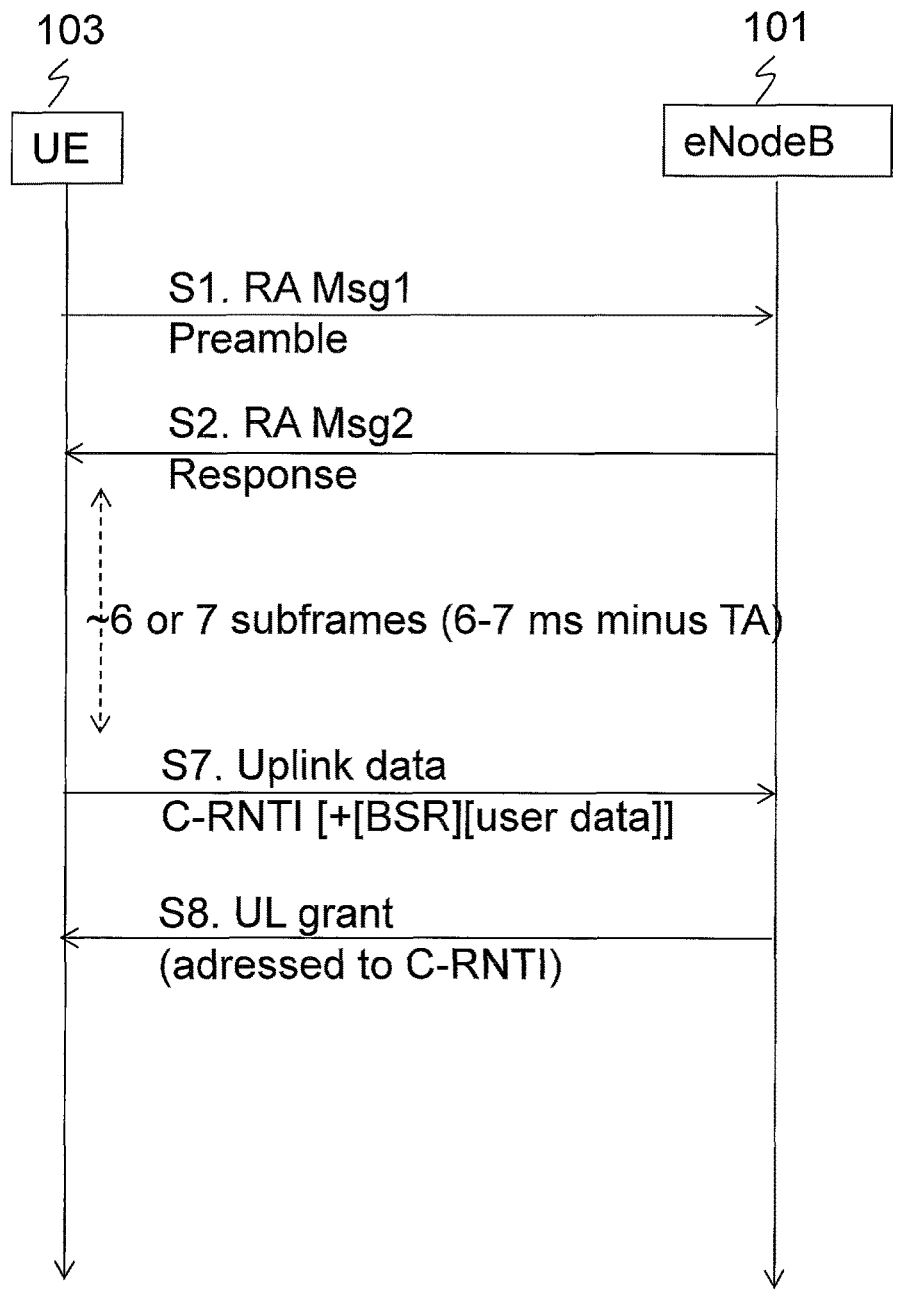
FIG. 5 is a signaling diagram illustrating the message sequence of the network access signaling when a connected UE lacking a valid timing advance wants to transmit UL data.

A dedicated preamble that is temporarily allocated for a paging response may be indicated in the Paging RRC message. The indicator of the dedicated RA preamble may in embodiments be one of the following:

A flag indicating a use of a preconfigured dedicated preamble;

An index indicating one out of a set of preconfigured dedicated preambles;

An explicit RA preamble ID, like the one in the RAPID subheader of a RA Response MAC message, as illustrated in FIG. 3. It would also be possible to reuse the entire RACH-ConfigDedicated IE, where RACH is the abbreviation for Random Access Channel. The RACH-ConfigDedicated IE also comprises a Physical RACH (PRACH) mask-index and is included in the mobility-ControlInfo IE in the RRCConnectionReconfiguration RRC message in conjunction with handovers.

In the two first indicator examples, one or more dedicated preambles may be preconfigured. They may be preconfigured via system information or they may be hardcoded according to the standard.

As already mentioned, the dedicated preamble is only temporarily allocated on a short term. There is thus a time window associated with the dedicated RA preamble, where the time window defines the time interval in which the dedicated RA preamble may be used. The size of the time window during which the dedicated preamble is reserved for the UE may be handled similarly as the indicator of the dedicated RA preamble. That is, it could be known by the UE a priori, e.g. through standardization or configured via the system information, or it could be indicated by an index or as an explicit value in the Paging RRC message.

An alternative to using the Paging RRC message could be to include the indicator in another message related to paging, such as in one or more MAC Control Element(s) in the MAC PDU that carries the Paging RRC message. Another alternative could be to use the DL Control Information (DCI) message, i.e. the DL scheduling assignment, on the PDCCH which indicates the paging by allocating the DL transmission resources on the PDSCH for the Paging RRC message. In all of these alternatives, the dedicated preamble could be indicated by a flag, an index, or an explicit RA preamble ID, and the time window could be known a priori, indicated by an index, or by an explicit value. No new message is thus introduced to signal the use of the dedicated RA preamble.

Yet another way to utilize the DCI on the PDCCH could be to use a special P-RNTI as an indication that a preconfigured dedicated preamble with an a priori known reservation time window should be used. The special P-RNTI may be signaled in the system information, as well as the dedicated preamble and the reservation time window. Alternatively, they may be defined in the standard, or at least the reservation time window could be standardized. A set of P-RNTIs may also be configured for this purpose, each P-RNTI of the set corresponding to a certain dedicated preamble. Such associations between P-RNTIs and dedicated RA preambles may be preconfigured and signaled in the system information. The reservation time window, which may also be indicated in the system information, may be the same or different for these dedicated preambles.

An additional benefit of such special P-RNTI(s) is that UEs that know that they are never subject to allocation of dedicated preambles in conjunction with paging can refrain from reading the Paging RRC message. The same goes for legacy UEs which don't support the allocation of a dedicated preamble in conjunction with paging.

In embodiments, the eNodeB may receive an indication that the UE is a suitable candidate for allocation of a dedicated RA preamble in a Paging S1AP message from the MME. This is further described below in the section "Selection of Target UEs". If the eNodeB receives such an indication from the MME, the eNodeB may still have a final decision of whether to allocate a dedicated RA preamble to the UE, since the eNodeB is managing the available dedicated RA preambles.

In the currently specified situations where contention-free RA preambles are used, i.e. during handover, the UE ignores the TC-RNTI received in RA Msg2, since it already has a valid C-RNTI which the eNodeB is aware of. However, with the proposed solution, the UE does not have any valid C-RNTI and hence it should not ignore the received TC-RNTI. Instead the UE may "promote" the received TC-RNTI to a regular C-RNTI, despite that it is using a dedicated contention-free RA preamble.

Selection of Target UEs

To inform the eNodeB of whether a certain UE to be paged is a suitable candidate for a dedicated preamble, the MME could indicate this in the Paging S1AP message. This indication may be a simple binary indication, e.g. a flag indicating candidate/not candidate. However, the indication may also include information of a "candidate priority" of the UE, accumulated statistics, or calculation results based on statistics (see section "Statistical data related to UE below"). Such information could assist the eNodeB to select UEs for allocation of dedicated RA preambles in case of a shortage of such preambles. The indication may also have the form of a UE category.

The MME in turn may retrieve this information in various ways. Some of the methods of acquiring information related to a UE's suitability as a candidate for allocation of a dedicated contention-free RA preamble are described hereinafter in sections A-E.

A. Subscription Data Related to UE

The information may be explicitly included in subscription data received from a Home Subscriber Server (HSS) or implicitly derived from the subscription data. However, the information would not be immediately relayed to the eNodeB. The eNodeB would, as described above, be informed through an indication in some form included in the Paging S1AP message during a subsequent paging event.

B. Indication in NAS Message from UE

The MME may receive the information explicitly in a NAS message, in particular the Attach Request NAS message, which initially registers the UE in an MME. The MME stores the information in the UE context, i.e. its data records associated with the UE. As one alternative the MME would also transfer the information to a new MME in case of MME relocation. In that case the UE only has to send the information to the network in the Attach Request NAS message. Otherwise, if the information is not transferred to the new MME during MME relocation, the UE has to include the information also in Tracking Area Update Request NAS messages. One exception is the Tracking Area Update Request NAS messages that are triggered by a timer—i.e. periodic Tracking Area Update—rather than by a movement to a new Tracking Area.

C. Capability Information from UE

Another possibility is that the MME receives the information from the UE in the Attach Request NAS message. Hence, the UE may indicate in the Attach Request NAS message that it has the suitable properties—e.g. that it is stationary—and/or is a candidate for allocation of a dedicated RA preamble.

The MME may also base its determination of the UE's suitability on information such as a UE capability or a device category. The information may be included in any of the IEs in the Attach Request NAS message that indicate various properties of the UE, i.e. the UE network capability IE, the Mobile station network capability IE, the Mobile station classmark 2 IE or the Device properties IE. The MME may keep the information in the UE context, i.e. its records of UE associated information, and may forward the information to a new MME in case of MME relocation.

D. Capability Information from eNodeB

Alternatively, the UE capability or device category information could be included in, or derived from, radio capability related parameters, e.g. by extending the UE-EUTRA-Capability IE with the concerned information. The information in the UE-EUTRA-Capability IE is received from the eNodeB, which in turn retrieves it from the UE, in conjunction with or directly after the attach procedure. In the current RRC specification the UE-EUTRA-Capability IE is included in the ue-CapabilityRAT-Container IE, which in turn is included in the ue-CapabilityRAT-ContainerList IE in the UECapabilityInformation message. In conjunction with the Attach procedure, i.e. when the UE first registers in the network and relevant contexts are established in core network nodes such as the MME and the gateway nodes, the eNodeB requests the capability information from the UE by sending the RRC message UECapabilityEnquiry to the UE. The UE responds with the RRC message UECapabilityInformation, including the capability information as described above. The eNodeB then forwards the information to the MME as follows. It includes the UECapabilityInformation message in a ue-RadioAccessCapabilityInfo IE, which it includes in a UERadioAccessCapabilityInformation message specified as an RRC message. The UERadioAccessCapabilityInformation message is in turn included in a UE Radio Capability IE, which the eNodeB sends to the MME in the S1AP message UE Capability Info Indication. The MME stores the UE capability information in its UE context and keeps it for as long as the UE remains attached to the network and transfers it to a new MME in case of MME relocation.

E. Statistical Data Related to UE

The network may also learn the suitability of a UE from observations and statistics. In this variant the network does not rely on any explicit indication or information to indicate that a UE has suitable properties and/or is a potential candidate for allocation of a dedicated RA preamble. Instead the network learns the relevant UE properties from observing and maintaining statistics on the UE and its behavior.

One relevant property that the network monitors is the degree of mobility of the UE. Optionally the network may combine this learned information with information about the device category of the UE, what kind of application that is running on it, and/or what kind of subscription it has when eventually determining whether to allocate a dedicated preamble to the UE.

Mobility observations may involve several different movement related events or measurements, such as:
  Inter-eNB handovers, both X2 based and S1 based
  Intra-eNB handovers
  Timing Advance measurements
  Doppler shift measurements
  Angle of Arrival (AoA) measurements
  Network assisted UE positioning
  UE autonomous UE positioning, e.g. Global Positioning System (GPS) measurements
  Idle mode movements, e.g. cell reselection The observations may be compiled to statistics that may be relevant for selection of UEs for allocation of dedicated RA preambles. A simple variant is to only monitor handover events, both intra-eNodeB and inter-eNodeB events, and to calculate a sliding average, e.g. an exponential average, of the handover frequency.

The eNodeB is the network node that is the most suitable for collecting this data. If measurements collected in the UE are to be used, such as GPS measurements or idle mode movement reports, then the eNodeB has to retrieve this information from the UE. One possibility for such retrieval is to make use of the RRC message exchange RRCInformationRequest from the eNodeB and RRCInformationResponse from the UE, and extend the RRCInformationResponse RRC message with the concerned information, e.g. with GPS coordinates. In general, the UE based information may be transferred on demand as in the section D where the eNodeB requests the capability information from the UE, periodically or opportunistically, i.e. utilizing messages that are anyway sent from the UE to the eNodeB.

The collected data may be forwarded to other eNodeBs during inter-eNodeB handovers, e.g. in an extension of the UE History Information IE in the Handover Request X2 Application Protocol (AP) message or in a new IE in that message.

The data will only be kept in an eNodeB as long as the UE remains in RRC_CONNECTED state. As soon as the UE goes to RRC_IDLE state or moves to another eNodeB, the data will be deleted together with other UE contextual data in the eNodeB. In order for the gathered data to be more reliable and relevant and to survive periods of RRC_IDLE state between periods of RRC_CONNECTED state, the eNodeB may transfer the accumulated data to the MME, e.g. in the UE Context Release Complete S1AP message. At inter-eNodeB handovers the source eNodeB may transfer the gathered information to the target eNodeB. Alternatively, the source eNodeB does not transfer the information to the target eNodeB, but instead transfers it to the MME in conjunction with the handover procedure. The data that is transferred to the MME may be kept in the MME, and forwarded to a new MME in case of MME relocation, as long as the UE remains attached to the network.

It would also be possible to bypass the eNodeB and let the MME and possibly the UE be responsible for the data collection. The MME itself can observe inter-eNodeB handovers from the Path Switch Request S1AP messages and may also observe intra-eNodeB handovers if it activates the UE location reporting feature across the S1 interface. In addition, the MME may be assisted by the UE, which may provide measurement results such as GPS coordinates and reports about primarily intra-eNodeB handover events and may also report movements performed during RRC_IDLE state, e.g. cell reselections. The UE may send its data to the MME in a suitable NAS message, e.g. one of the NAS messages Attach Request, Service Request or Tracking Area Update Request or in a new NAS message. The possible data from the UE may be transferred to the MME periodically, on demand or opportunistically, e.g. utilizing a Service Request NAS message. If the data is maintained in the MME, the MME has to ensure that the eNodeB receives relevant information for its selection of UEs to allocate dedicated preambles to. Hence, the MME has to transfer the data, a compiled version of the data, e.g. in the form of handover frequency or probability of handover, or a simple indication of whether the UE is a suitable candidate for allocation of a dedicated preamble to the eNodeB when the UE is to be paged, preferably in the Paging S1AP message.

To provide even better statistics as the basis for the selection of UEs for allocation of dedicated preambles, the data may be stored in a database where it can survive periods when the UE is detached from the network. To this end, the MME may store the data in the HSS, in a database in the Operation and Maintenance (O&M) system or some other, potentially new, database that is accessible from or mirrored among all the MMEs in the network. As an option, the MME may store it in an MME internal database, only available to the MME itself, or in an MME pool internal database, only available to the MMEs in the same pool. If the data is stored in the HSS, the data may for instance be transferred from the MME to the HSS in a Cancel Location Ack message. When a UE registers in a new MME, e.g. through the Attach or Tracking Area Update procedure, the relevant data and statistics may be transferred from the HSS to the MME in an Update Location Ack message.

When storing new data in the database it should be integrated with the already accumulated data or, in some cases, replace the previously stored data. The integration with the already accumulated data may for instance be in the form of a simple addition or as an update of a sliding or moving average.

Proactive Allocation of Dedicated Preamble Based on Knowledge of UE Transmission Schedule If the MME through some means is aware of some regular UL transmission schedule of a UE, it may predict when the UE will initiate the RA procedure and thus could benefit from a dedicated RA preamble. The MME may then request the eNodeB(s) to allocate a dedicated preamble to the UE right before an UL transmission.

This request may have the form of a Paging S1AP message with an indication that instructs or recommends the eNodeB to allocate a dedicated contention-free RA preamble to the UE with this page. It could even be so that the allocation is the actual purpose of the page, i.e. that no actual response is expected even though the UE very soon will contact the network, although maybe after a slightly longer time than would be the case for a regular page response.

Potential methods of acquiring the UL transmission schedule of a UE include learning based on previous UL transmissions or information received from an Application Server associated with the UE or a Services Compatibility Server belonging to, or in connection with, the organization owning the UE, in case the UE is an MTC device. Possibly, the MME receives information of the periodicity of the UE's UL transmissions from either of these sources and then by itself learns the "phase" of the transmission periods. Yet an alternative is that the UE itself informs the MME of its transmission schedule.

Load Based Use of Allocation of Dedicated Preambles

As a management strategy for the pool of potential dedicated preambles in a cell, the eNodeB may choose to use the herein described feature of allocating dedicated contention-free RA preambles only when the strain on the pool of dedicated preambles is low. Another alternative is to allocate dedicated RA preambles also when the strain on the pool of dedicated preambles is high, but only to high priority UEs. Alternatively the eNodeB may adapt the number of UEs that are subject to allocation of dedicated contention-free RA preambles depending on the availability of dedicated preambles in the cell. Yet another alternative is that the eNodeB adapts the lease time, i.e. the time window, of allocated dedicated contention-free RA preambles depending on the availability of dedicated preambles in the cell. Still, the UE should be given at least a reasonable chance to respond to the page before the lease time expires. If this is not successful, the UE has to use a regular random access preamble when accessing the network to respond to the page.

Allocation of Dedicated Preambles to a Subset of Available PRACH Resources

In order to limit the negative impact on the available preamble pool that allocation of dedicated, contention-free random access preambles may have, it would be possible to make the allocation valid for only a subset of the available PRACH resources. This may be done in the time domain, in the frequency domain (which is preferred in order not to risk increasing the page response delay), or a combination of both.

Allocation with limited validity in the time domain, i.e. intermittent allocation or validity of allocation, could for instance be that the allocation of a dedicated contention-free RA preamble is made to apply only for certain periodically reoccurring PRACH occasions/resources, i.e. not to all PRACH occasions/resources.

Allocation with restrictions in the frequency domain would mean that the allocation is valid in a subset of the PRACH resources at every PRACH opportunity, i.e. every subframe where PRACH resources are available. As an example of frequency domain restriction of the allocation validity, a dedicated, contention-free random access preamble may be allocated for use in only, say, one out of three available PRACH resources in each PRACH subframe.

If allocation restrictions are applied in both the time and frequency domain, this could for instance mean that the allocation is valid for a subset of the PRACH subframes and only for a subset of the PRACH resources within the PRACH subframe subset.

Irrespective of whether limited allocation validity is used and which type of validity limitation that is used, the lease time of the preamble, i.e. the time window within which it may be used by the concerned UE, may not be exceeded.

When the validity of the preamble allocation is limited to certain PRACH occasions/resources, the concerned preamble would be available for other usage for other PRACH occasions/resources.

Methods

Figure 6A:
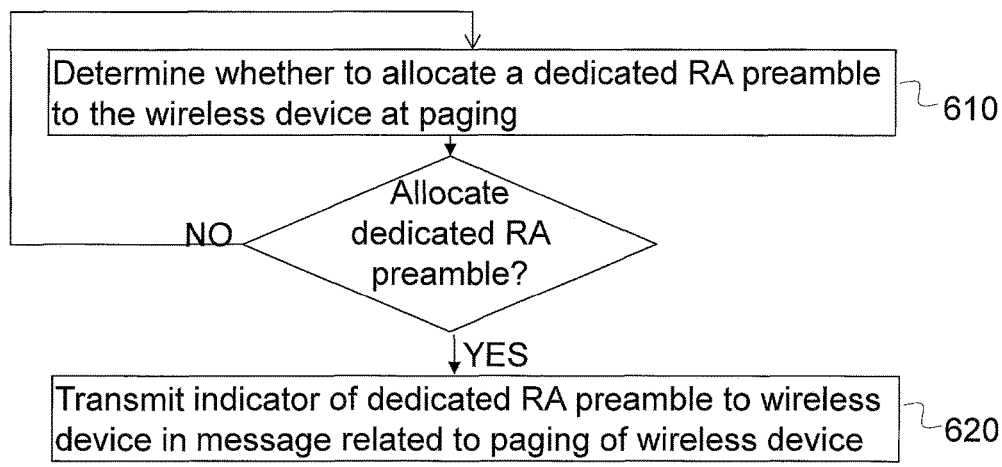
FIGS. 6a-b are flowcharts illustrating the method in a radio network node according to embodiments.

FIG. 6a is a flowchart illustrating an embodiment of a method for supporting RA of a wireless device 103. The method is performed in a radio network node 101 of a wireless communication system. The radio network node serves a cell. As in the example embodiments described previously, the wireless device 103 may be a UE, and the radio network node may be an eNodeB in LTE. The method comprises:

610: Determining whether to allocate a dedicated RA preamble to the wireless device at paging of the wireless device 103 in the cell.

When it is determined to allocate the dedicated RA preamble to the wireless device 103 at paging, the method further comprises:

620: Transmitting an indicator of the dedicated RA preamble to the wireless device 103 in a message related to the paging of the wireless device 103. The dedicated RA preamble is valid for RA during a time window. The message related to the paging of the wireless device 103 may be at least one of the following: a paging message; a packet data unit carrying the paging message; and a message indicating a paging in the cell. In LTE, the paging message corresponds to the Paging RRC message, and the packet data unit carrying the paging message corresponds to the MAC PDU that carries the Paging RRC message. Furthermore, the message indicating the paging corresponds to the DCI message, i.e. the DL scheduling assignment, on the PDCCH which indicates the paging by allocating the DL transmission resources on the PDSCH for the Paging RRC message, wherein the DCI message is addressed to the Paging-RNTI (P-RNTI).

Figure 6B:
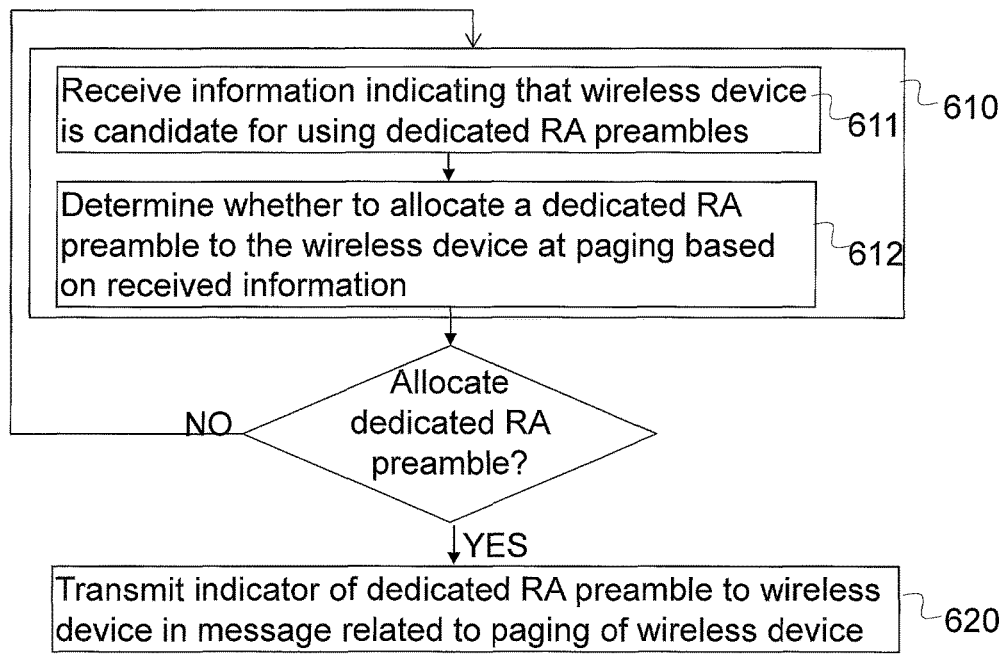

FIG. 6b is a flowchart illustrating another embodiment of the method in the radio network node 101. The determining 610 whether to allocate the dedicated RA preamble comprises:

611: Receiving information indicating that the wireless device 103 is a candidate for using dedicated RA preambles. The information is received from a core network node 102 connected to the radio network node 101. As described above, this may be the MME indicating that the wireless device 103 is a candidate in the Paging S1AP message. The received information may be a simple binary indication or a flag. However, the information may also include information of a "candidate priority" of the UE, accumulated statistics, or calculation results based on statistics as described above.

612: Determining whether to allocate the dedicated RA preamble to the wireless device 103 based on the received information.

The method further comprises step 620 of transmitting an indicator of the dedicated RA preamble to the wireless device 103 when it is determined to allocate the dedicated RA preamble, as described above with reference to FIG. 6a.

In any of the above described embodiments, the determining 610 whether to allocate the dedicated RA preamble may be based on an availability of dedicated RA preambles in the cell, as described above in the previous section "Load Based Use of Allocation of Dedicated Preambles".

As described above, the dedicated RA preambles may be preconfigured, i.e. signaled to the wireless device 103 through system information or hardcoded in the wireless device 103 as set by the standard. The method may thus in an embodiment further comprise transmitting the dedicated RA preamble or an identifier of the dedicated RA preamble to the wireless device 103 prior to determining 610 whether to allocate the dedicated RA preamble. This thus corresponds to the pre-configuration of the preambles. In one embodiment, the indicator of the dedicated RA preamble, transmitted to the wireless device 103 in step 620, indicates that the transmitted dedicated RA preamble, or one of the dedicated RA preambles, preconfigured in the wireless device 103, is to be used by the wireless device 103 for an RA procedure. The indicator may e.g. be a flag indicating that the preconfigured dedicated preamble is to be used, or it may be an index indicating one out of a set of preconfigured dedicated preambles to be used. In another exemplary embodiment, a special P-RNTI may be used for the DL scheduling assignment for the Paging RRC message, as an indication that the preconfigured dedicated preamble should be used. In one embodiment, the reservation time window may typically also be preconfigured.

In an alternative to pre-configuring the dedicated RA preambles, the indicator of the dedicated RA preamble may be the dedicated RA preamble itself or an identifier of the dedicated RA preamble. In this embodiment, the dedicated RA preamble or an identifier of it is transmitted to wireless device 103 when the wireless device 103 is paged.

In any of the above described embodiments, the time window associated with the dedicated RA preamble may be preconfigured e.g. via the system information, or it may be transmitted to the device at the paging. The information related to the time window may thus be transmitted to the wireless device 103 prior to determining 610 whether to allocate the dedicated RA preamble, and/or in the message related to the paging of the wireless device 103, such as in the Paging RRC message.

Figure 7:
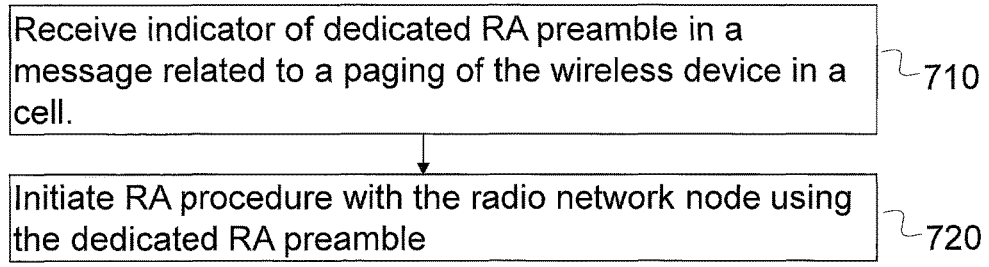
FIG. 7 is a flowchart illustrating the method in a wireless device according to embodiments.

FIG. 7 is a flowchart illustrating an embodiment of a method for RA performed in the wireless device 103. This embodiment corresponds to the embodiment of the radio network node described with reference to FIG. 6a. As in the example embodiments described previously, the wireless device 103 may be a UE, and the radio network node may be the eNodeB in LTE. The method comprises:

710: Receiving from the radio network node 101 of a wireless communication system, an indicator of a dedicated RA preamble in a message related to a paging of the wireless device 103 in a cell served by the radio network node 101. The dedicated RA preamble is valid for RA during a time window. The message related to the paging may be at least one of the following: a paging message; a packet data unit carrying the paging message; and a message indicating a paging in the cell.

720: Initiating a RA procedure with the radio network node 101 using the dedicated RA preamble.

As already described above, the dedicated RA preamble may be preconfigured. Therefore, the method may further comprise receiving the dedicated RA preamble or an identifier of the dedicated RA preamble from the radio network node 101 prior to receiving 710 the indicator of the dedicated RA preamble. In one embodiment, the indicator of the dedicated RA preamble indicates that the received dedicated RA preamble, or the dedicated RA preamble identified by the received identifier, or one of the dedicated RA preambles preconfigured in the device, is to be used for the RA procedure.

Alternatively, the indicator of the dedicated RA preamble may be the dedicated RA preamble itself or an identifier of the RA preamble.

Information related to the time window may be received from the radio network node 101 prior to receiving 710 the indicator of the dedicated RA preamble. The time window is in this embodiment preconfigured. Information related to the time window may also be received from the radio network node 101 in the message related to the paging of the wireless device 103.

Figure 8:
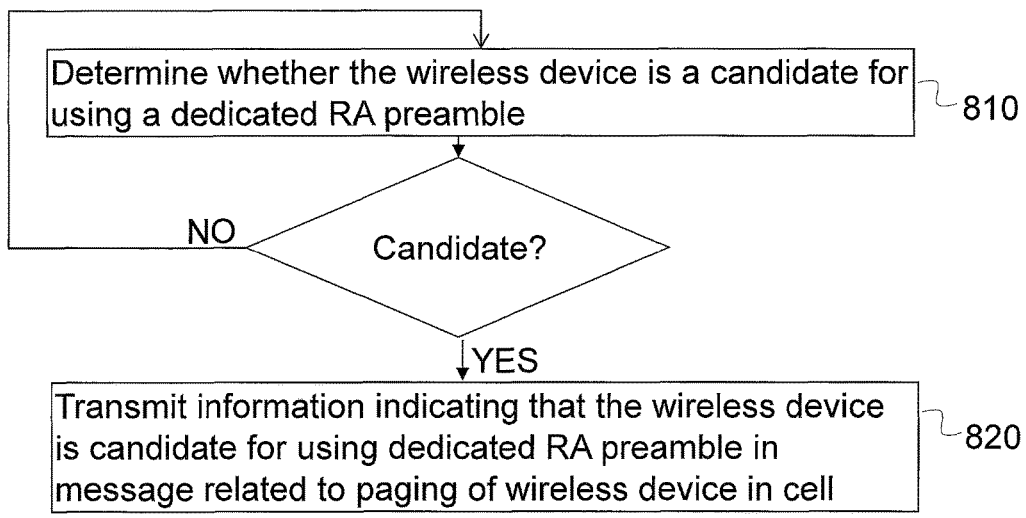
FIG. 8 is a flowchart illustrating the method in a core network node according to embodiments.

FIG. 8 is a flowchart illustrating an embodiment of a method for supporting RA of a wireless device 103. The method is performed in a core network node 102 of a wireless communication system connected to a radio network node 101 serving a cell in which the wireless device 103 is paged. This embodiment corresponds to the embodiment of the radio network node described with reference to FIG. 6b. As in the example embodiments described previously, the wireless device 103 may be a UE, the radio network node may be an eNodeB, and the core network node may be an MME in LTE. The method comprises:

810: Determining whether the wireless device 103 is a candidate for using dedicated RA preambles. The determining whether the wireless device 103 is a candidate, may be based on at least one of the following: subscription data related to the wireless device 103 (see section A. Subscription data related to UE); first capability information received from the wireless device 103 in an attach request message (see section C. Capability information from UE); second capability information related to the wireless device 103, received from the radio network node 101 in conjunction with an attach procedure for the wireless device 103 (see section D. Capability information from eNodeB); and statistical data related to the wireless device 103 (see section E. Statistical data related to UE).

When the wireless device 103 is a candidate, the method further comprises:

820: Transmitting information to the radio network node 101 indicating that the wireless device 103 is a candidate for using dedicated RA preambles. The information is transmitted in a message related to the paging of the wireless device 103 in the cell. As described above, the message may be a Paging S1AP message from the MME to the eNodeB.

Apparatus

Figure 9A:
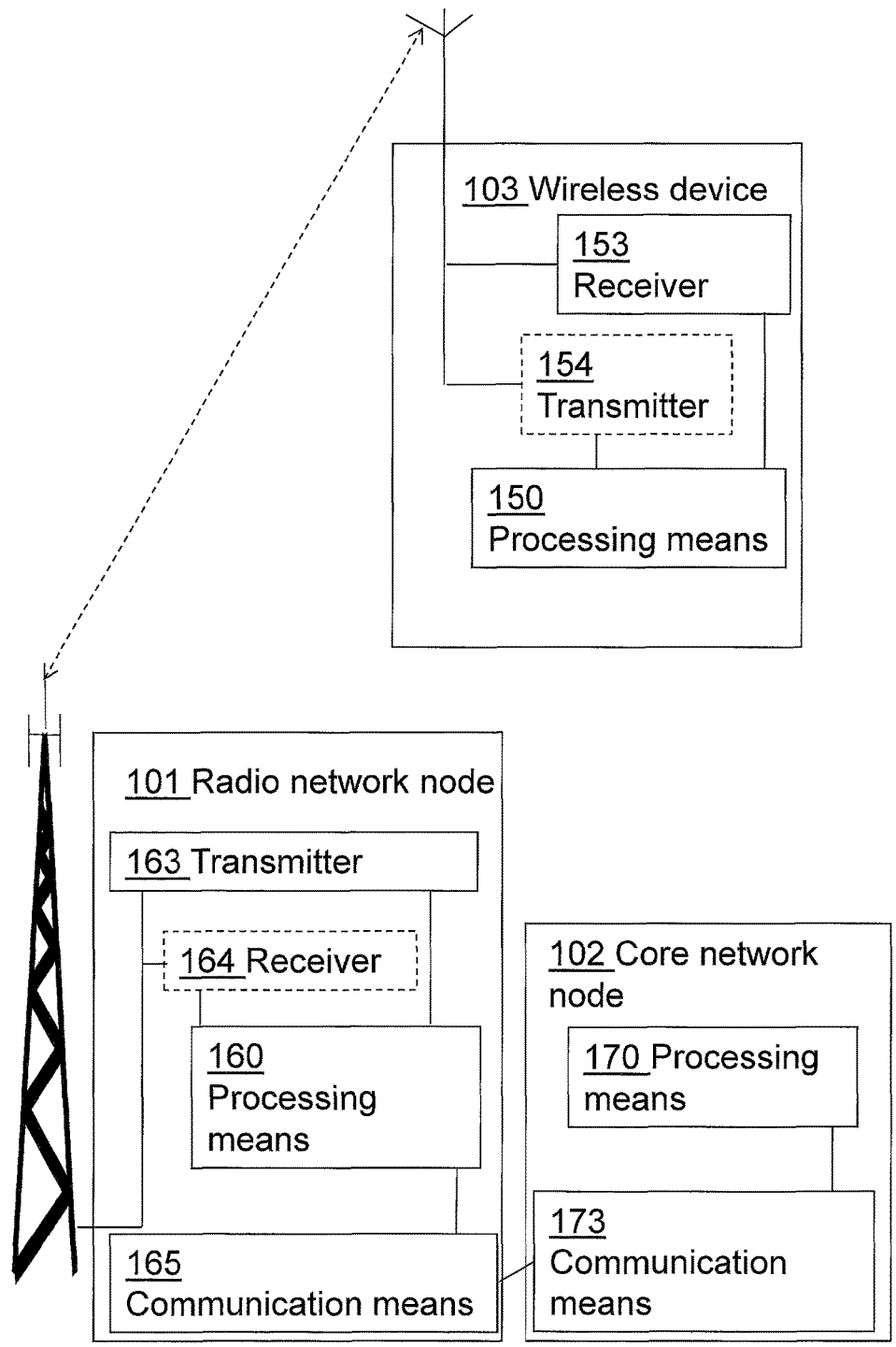
FIGS. 9a-c are block diagrams schematically illustrating a radio network node, a wireless device, and a core network node according to embodiments.

An embodiment of a radio network node 101 and a core network node 102 of a wireless communication system, and a wireless device 103 is schematically illustrated in the block diagram in FIG. 9*a*.

The radio network node 101 is suitable for supporting RA of a wireless device 103. The radio network node 101 is configured to serve a cell 105*a*. The radio network node 101 comprises processing means 160, and a transmitter 163. The radio network node 101 may also comprise a receiver 164 for receiving information from the wireless device 103. The processing means is adapted to determine whether to allocate a dedicated RA preamble to the wireless device 103 at paging of the wireless device 103 in the cell 105*a*. The processing means 160 is also adapted to transmit an indicator of the dedicated RA preamble via the transmitter 163 to the wireless device 103 when it is determined to allocate the dedicated RA preamble to the wireless device 103 at paging. The indicator is transmitted in a message related to the paging of the wireless device 103. The dedicated RA preamble is valid for RA during a time window.

The message related to the paging may be a paging message, a packet data unit carrying the paging message, and/or a message indicating a paging in the cell 105*a*.

In one embodiment, the radio network node 101 may further comprise communication means 165 for communicating with a core network node 102. The processing means 160 may be adapted to determine whether to allocate the dedicated RA preamble by receiving, via the communication means 165, from the core network node 102, information indicating that the wireless device 103 is a candidate for using dedicated RA preambles; and determining whether to allocate the dedicated RA preamble to the wireless device 103 based on the received information.

In embodiments, the processing means 160 may be adapted to determine whether to allocate the dedicated RA preamble to the wireless device 103 based on an availability of dedicated RA preambles in the cell 105*a*.

In one embodiment, the processing means 160 may be further adapted to transmit, via the transmitter 163, the dedicated RA preamble or an identifier of the dedicated RA preamble to the wireless device 103 prior to determining whether to allocate the dedicated RA preamble. The indicator of the dedicated RA preamble may indicate that the transmitted dedicated RA preamble or the dedicated RA preamble identified by the transmitted identifier is to be used by the wireless device for an RA procedure. In an alternative embodiment, the indicator of the dedicated RA preamble may be the dedicated RA preamble itself or an identifier of the dedicated RA preamble.

In any of the embodiments, the processing means 160 is adapted to transmit information related to the time window to the wireless device 103 via the transmitter 163 prior to determining whether to allocate the dedicated RA preamble, and/or in the message related to the paging of the wireless device 103.

The wireless device 103 in FIG. 9*a* is configured for RA. The wireless device 103 comprises processing means 150 and a receiver 153. The wireless device 103 may also comprise a transmitter 154 for transmitting information to the radio network node 101. The processing means 150 is adapted to receive, via the receiver 153, from the radio network node 101, an indicator of a dedicated RA preamble in a message related to a paging of the wireless device 103 in the cell 105*a* served by the radio network node 101. The dedicated RA preamble is valid for RA during a time window. The processing means 150 is also adapted to initiate a RA procedure with the radio network node 101 using the dedicated RA preamble.

In embodiments, the message related to the paging is a paging message; a packet data unit carrying the paging message; and/or a message indicating a paging in the cell 105*a*.

In one embodiment, the processing means 150 may be adapted to receive, via the receiver 153, the dedicated RA preamble or an identifier of the dedicated RA preamble from the radio network node 101 prior to receiving the indicator of the dedicated RA preamble. The indicator of the dedicated RA preamble may indicate that the received dedicated RA preamble or the dedicated RA preamble identified by the received identifier is to be used for the RA procedure. In an alternative embodiment, the indicator of the dedicated RA preamble is the dedicated RA preamble itself or an identifier of the RA preamble.

In any of the embodiments, the processing means 150 may be adapted to receive information related to the time window via the receiver 153 from the radio network node 101 prior to receiving the indicator of the dedicated RA preamble; and/or in the message related to the paging of the wireless device 103.

The core network node 102 in FIG. 9*a* is suitable for supporting RA of a wireless device 103. The core network node 102 is configured to be connected to a radio network node 101 serving a cell 105*a* in which the wireless device 103 is paged. The core network node 102 comprises processing means 170 and communication means 173 for communicating with the radio network node 101. The processing means 170 is adapted to determine whether the wireless device 103 is a candidate for using dedicated RA preambles, and, when the wireless device 103 is a candidate, transmit information via the communication means 173 to the radio network node 101 in a message related to the paging of the wireless device 103 in the cell 105*a*. The transmitted information indicates that the wireless device 103 is a candidate for using dedicated RA preambles.

In embodiments, the processing means 170 may be adapted to determine whether the wireless device 103 is a candidate, based on at least one of the following:
subscription data related to the wireless device 103;
first capability information received from the wireless device 103 in an attach request message;
second capability information related to the wireless device 103. The second capability information is received from the radio network node 101 in conjunction with an attach procedure for the wireless device 103; and statistical data related to the wireless device 103.

Figure 9B:
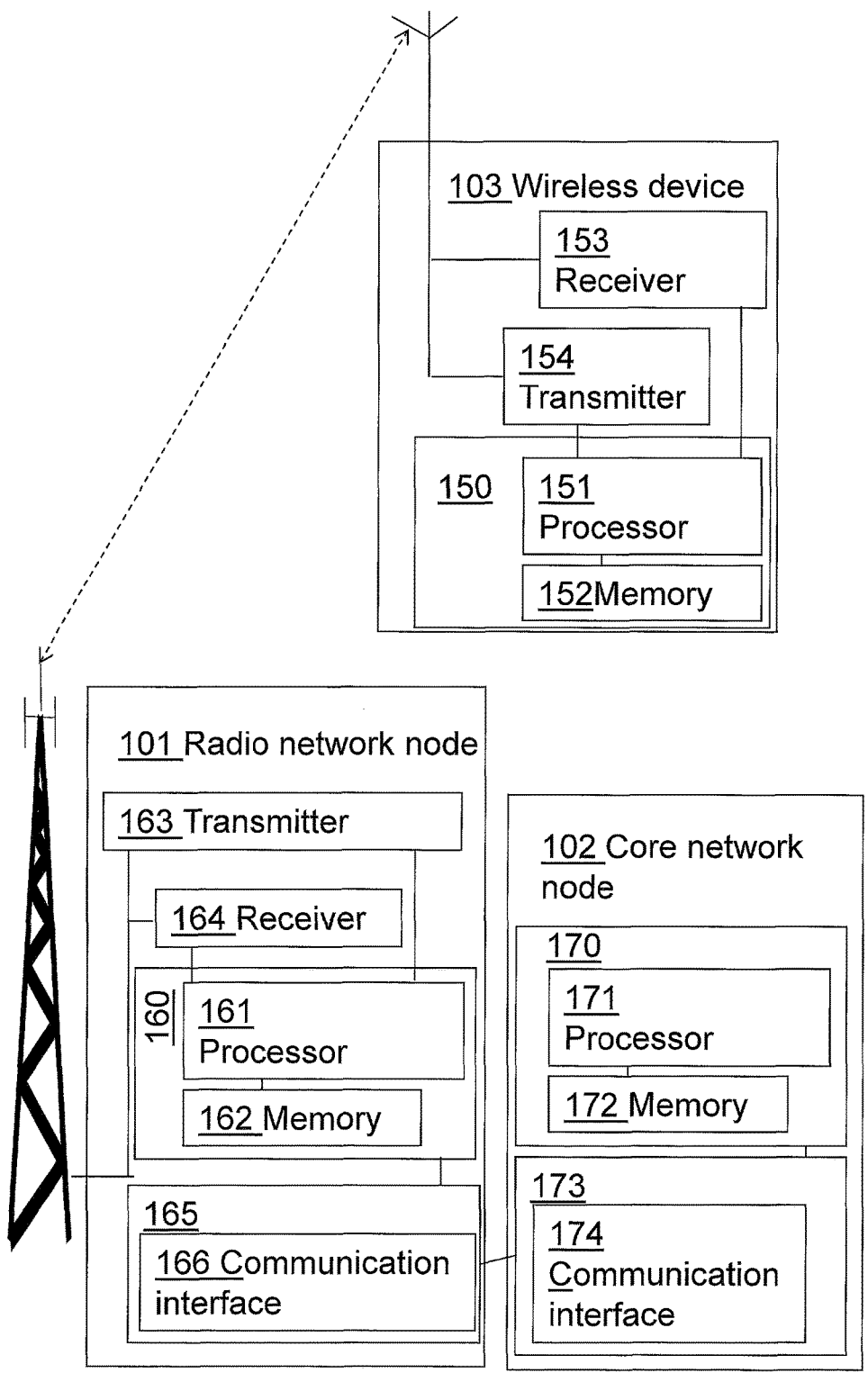

In an alternative way to describe the embodiment in FIG. 9a, illustrated in FIG. 9b, the processing means 160 of the radio network node 101 comprises a processor 161 and a memory 162, and the communication means 165 comprises a communication interface 166, supporting e.g. the S1 interface between the radio access network and the core network in EPS. The memory 162 comprises instructions executable by the processor 161 whereby the radio network node 101 is operative to determine whether to allocate a dedicated RA preamble to the wireless device 103 at paging of the wireless device 103 in the cell. When it is determined to allocate the dedicated RA preamble to the wireless device 103 at paging, the radio network node 101 is operative to transmit an indicator of the dedicated RA preamble via the transmitter 163 to the wireless device 103 in a message related to the paging of the wireless device 103. The dedicated RA preamble is valid for RA during a time window. The message related to the paging may be a paging message; a packet data unit carrying the paging message; and/or a message indicating a paging in the cell. The radio network node 101 is configured to be connected to the core network node 102, and may be further operative to determine whether to allocate the dedicated RA preamble by: receiving, via the communication interface 166, information indicating that the wireless device 103 is a candidate for using dedicated RA preambles, the information being received from the core network node 102, and by determining whether to allocate the dedicated RA preamble to the wireless device 103 based on the received information. In embodiments, the radio network node 101 may be operative to determine whether to allocate the dedicated RA preamble to the wireless device 103 based on an availability of dedicated RA preambles in the cell. In one embodiment, the radio network node 101 may further be operative to transmit, via the transmitter 163, the dedicated RA preamble or an identifier of the dedicated RA preamble to the wireless device 103 prior to determining whether to allocate the dedicated RA preamble. The indicator of the dedicated RA preamble may indicate that the transmitted dedicated RA preamble or the dedicated RA preamble identified by the transmitted identifier is to be used by the wireless device 103 for the RA procedure. In an alternative embodiment, the indicator of the dedicated RA preamble is the dedicated RA preamble itself or an identifier of the dedicated RA preamble. In any of the embodiments, the radio network node 101 may be operative to transmit information related to the time window to the wireless device 103 via the transmitter 163: prior to determining whether to allocate the dedicated RA preamble; and/or in the message related to the paging of the wireless device 103.

Further, in the alternative of FIG. 9b, the processing means 150 of the wireless device 103 comprises a processor 151 and a memory 152. The memory 152 comprises instructions executable by the processor 151 whereby the wireless device 103 is operative to receive via the receiver 153 from a radio network node 101 of a wireless communication system, an indicator of a dedicated RA preamble in a message related to a paging of the wireless device 103 in a cell served by the radio network node 101. The dedicated RA preamble is valid for RA during a time window. The wireless device 103 is also operative to initiate a RA procedure with the radio network node 101 using the dedicated RA preamble. In embodiments, the message related to paging may be a paging message; a packet data unit carrying the paging message; and/or a message indicating a paging in the cell. In one embodiment, the wireless device 103 may be operative to receive, via the receiver 153, the dedicated RA preamble or an identifier of the dedicated RA preamble from the radio network node 101 prior to receiving the indicator of the dedicated RA preamble. The indicator of the dedicated RA preamble may indicate that the received dedicated RA preamble is to be used for the RA procedure. In an alternative embodiment, the indicator of the dedicated RA preamble is the dedicated RA preamble itself or an identifier of the RA preamble. In any of the embodiments, the wireless device 103 may be operative to receive information related to the time window via the receiver 153 from the radio network node 101 prior to receiving the indicator of the dedicated RA preamble; and/or in the message related to the paging of the wireless device 103.

In FIG. 9b, the processing means 170 of the core network node 102 comprises a processor 171 and a memory 172, and the communication means 173 comprises a communication interface 174, supporting for example the S1 interface. The memory 172 comprises instructions executable by the processor 171 whereby the core network node 102 is operative to determine whether the wireless device 103 is a candidate for using dedicated RA preambles. When the wireless device 103 is a candidate, the core network node is operative to transmit information via the communication interface 174 to the radio network node 101 indicating that the wireless device 103 is a candidate for using dedicated RA preambles. The information is transmitted in a message related to the paging of the wireless device 103 in the cell. In embodiments, the core network node 102 may be operative to determine whether the wireless device 103 is a candidate, based on at least one of the following: subscription data related to the wireless device 103; first capability information received from the wireless device 103 in an attach request message; second capability information related to the wireless device 103, received from the radio network node 101 in conjunction with an attach procedure for the wireless device 103; statistical data related to the wireless device 103.

It is to be noted that the term processor used herein includes any hardware capable of executing instructions and/or program codes, e.g., a microprocessor such as a Central Processing Unit (CPU), a digital signal processor (DSP), or any other general-purpose or application specific processors. Furthermore, the term memory used herein includes any storage medium capable of storing instructions and/or program codes, e.g., a magnetic storage medium, an optical storage medium, a semiconductor storage medium and any other volatile or non-volatile storage mediums.

Figure 9C:
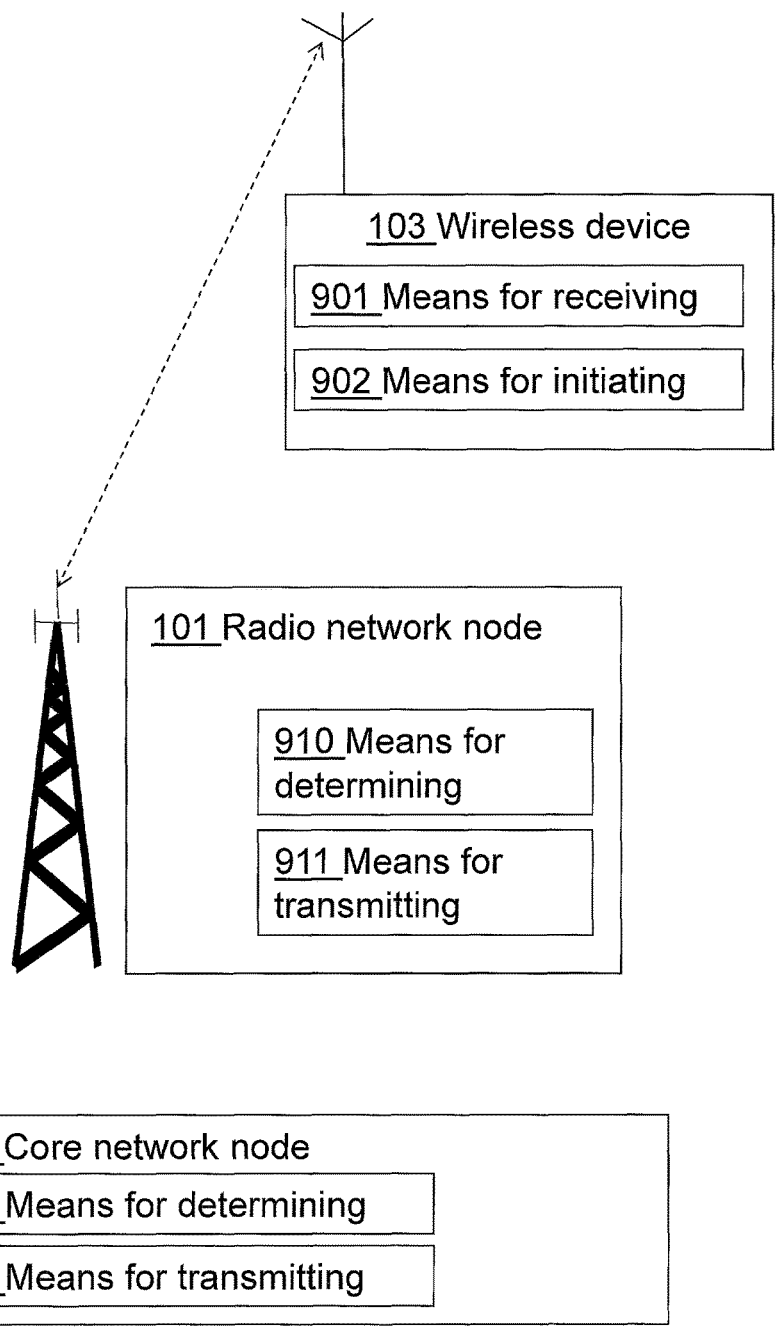

In still another alternative way to describe the embodiment in FIG. 9a, illustrated in FIG. 9c, the radio network node 101 comprises means 910 adapted to determine whether to allocate a dedicated RA preamble to the wireless device 103 at paging of the wireless device 103 in the cell. The radio network node 101 also comprises means 911 adapted to transmit an indicator of the dedicated RA preamble to the wireless device 103 in a message related to the paging of the wireless device 103. The dedicated RA preamble is valid for RA during a time window.

The wireless device 103 comprises means 901 adapted to receive from the radio network node 101, an indicator of a dedicated RA preamble in a message related to a paging of the wireless device 103 in a cell served by the radio network node 101. The dedicated RA preamble is valid for RA during a time window. The wireless device 103 also comprises means 902 adapted to initiate an RA procedure with the radio network node 101 using the dedicated RA preamble.

The core network node 102 comprises means 921 adapted to determine whether the wireless device 103 is a candidate for using a dedicated RA preamble. The core network node 102 also comprises means 922 adapted to transmit information to the radio network node 101 indicating that the wireless device 103 is a candidate for using dedicated RA preambles. The information is transmitted in a message related to the paging of the wireless device 103 in the cell.

The means described above are functional units which may be implemented in hardware, software, firmware or any combination thereof. In one embodiment, the means are implemented as a computer program running on a processor.

The radio network node 101, the core network node 102, and the wireless device 103 may comprise a Central Processing Unit (CPU) each, which may be a single unit or a plurality of units. Furthermore, the radio network node 101, the core network node 102, and the wireless device 103 comprise at least one computer program product (CPP) each in the form of a non-volatile memory, e.g. an EEPROM (Electrically Erasable Programmable Read-Only Memory), a flash memory or a disk drive. The CPP comprises a computer program, which in turn comprises code means which when run on the radio network node 101, the core network node 102, and the wireless device 103 respectively, causes the CPU to perform steps of the methods described earlier in conjunction with FIGS. 6a-b, 7 and 8. In other words, when said code means are run on the CPU, they correspond to the processing means 160, 170, 150, in the radio network node 101, the core network node 102, and the wireless device 103.

The above mentioned and described embodiments are only given as examples and should not be limiting. Other solutions, uses, objectives, and functions within the scope of the accompanying patent claims may be possible.

ABBREVIATIONS

3GPP 3rd Generation Partnership Project
AoA Angle of Arrival
BI Backoff Indicator
BSR Buffer Status Report
C-RNTI Cell Radio Network Temporary Identifier
DCI DL Control Information
DL Downlink
EPS Evolved Packet System
E-UTRAN Evolved Universal Terrestrial Radio Access Network
FDD Frequency Division Duplex
GPS Global Positioning System
HSS Home Subscriber Server
ID Identity/Identifier
IE Information Element
LTE Long Term Evolution
M2M Machine-to-Machine
MAC Medium Access Control
MD Machine Device
MME Mobility Management Entity
Msg Message
MTC Machine Type Communication
NAS Non-Access Stratum
O&M Operation and Maintenance
PDCCH Physical DL Control Channel
PDSCH Physical DL Shared Channel
PDU Packet Data Unit
PRACH Physical RA Channel
P-RNTI Paging RNTI
PUCCH Physical UL Control Channel
PUSCH Physical UL Shared Channel
RA Random Access
RACH RA Channel
RAPID RA Preamble ID
RAR RA Response
RNTI Radio Network Temporary Identifier
RRC Radio Resource Control
S1 The interface between the radio access network and the core network in EPS.
S1AP S1 Application Protocol (a protocol used between an eNodeB and an MME)
S-TMSI S-Temporary Mobile Subscriber Identity
TA Timing Advance
TC-RNTI Temporary C-RNTI
TDD Time Division Duplex
TS Technical Specification
UE User Equipment
UL Uplink
UMTS Universal Mobile Telecommunications System
X2 The interface between two eNodeBs in LTE.
X2AP X2 Application Protocol

The invention claimed is:

1. A method for supporting random access of a wireless device, the method being performed in a radio network node of a wireless communication system, the radio network node serving a cell, the method comprising:
   determining whether to allocate a dedicated random access preamble to the wireless device at paging of the wireless device in the cell, wherein the dedicated random access preamble or an identifier of the dedicated random access preamble is transmitted to the wireless device prior to the determining of whether to allocate the dedicated random access preamble; and
   in response to a determination to allocate the dedicated random access preamble to the wireless device at paging, transmitting an indicator of the dedicated random access preamble to the wireless device in a message related to the paging of the wireless device, wherein the dedicated random access preamble is valid for random access during a time window.

2. The method according to claim 1, wherein the message related to the paging is at least one of the following:
   a paging message;
   a packet data unit carrying the paging message; and
   a message indicating a paging in the cell.

3. The method according to claim 1, wherein determining whether to allocate the dedicated random access preamble comprises:
   receiving information indicating that the wireless device is a candidate for using dedicated random access preambles, the information being received from a core network node connected to the radio network node; and
   determining whether to allocate the dedicated random access preamble to the wireless device based on the received information.

4. The method according to claim 1, wherein the determining of whether to allocate the dedicated random access preamble is based on an availability of dedicated random access preambles in the cell.

5. The method according to claim 1, wherein the indicator of the dedicated random access preamble indicates that the transmitted dedicated random access preamble or the dedicated random access preamble identified by the transmitted identifier is to be used by the wireless device for a random access procedure.

6. The method according to claim 1, wherein the indicator of the dedicated random access preamble is the dedicated random access preamble itself or an identifier of the dedicated random access preamble.

7. The method according to claim 1, wherein information related to the time window is transmitted to the wireless device at least one of:
   prior to the determining of whether to allocate the dedicated random access preamble; and
   in the message related to the paging of the wireless device.

8. A method for random access performed in a wireless device, the method comprising:
   receiving from a radio network node of a wireless communication system, an indicator of a dedicated random access preamble in a message related to a paging of the wireless device in a cell served by the radio network node, wherein the dedicated random access preamble or an identifier of the dedicated random access preamble is received from the radio network node prior to the receiving of the indicator of the dedicated random access preamble, wherein the dedicated random access preamble is valid for random access during a time window; and
   initiating a random access procedure with the radio network node using the dedicated random access preamble.

9. The method according to claim 8, wherein the message related to the paging is at least one of the following:
   a paging message;
   a packet data unit carrying the paging message; and
   a message indicating a paging in the cell.

10. The method according to claim 8, wherein the indicator of the dedicated random access preamble indicates that the received dedicated random access preamble or the dedicated random access preamble identified by the received identifier is to be used for the random access procedure.

11. The method according to claim 8, wherein the indicator of the dedicated random access preamble is the dedicated random access preamble itself or an identifier of the dedicated random access preamble.

12. The method according to claim 8, wherein information related to the time window is received from the radio network node at least one of:
   prior to the receiving of the indicator of the dedicated random access preamble; and
   in the message related to the paging of the wireless device.

13. A radio network node of a wireless communication system for supporting random access of a wireless device, the radio network node being configured to serve a cell, the radio network node comprising:
   a transmitter configured to transmit signals; and
   processing circuitry configured to:
      determine whether to allocate a dedicated random access preamble to the wireless device at paging of the wireless device in the cell, wherein the dedicated random access preamble or an identifier of the dedicated random access preamble is transmitted to the wireless device prior to the determining of whether to allocate the dedicated random access preamble; and
      in response to a determination to allocate the dedicated random access preamble to the wireless device at paging, transmit an indicator of the dedicated random access preamble via the transmitter to the wireless device in a message related to the paging of the wireless device, wherein the dedicated random access preamble is valid for random access during a time window.

14. The radio network node according to claim 13, wherein the message related to the paging is at least one of the following:
   a paging message;
   a packet data unit carrying the paging message; and
   a message indicating a paging in the cell.

15. The radio network node according to claim 13, further comprising a communication interface configured to communicate with a core network node, and wherein the processing circuitry is configured to determine whether to allocate the dedicated random access preamble by:
   receiving, via the communication interface, information indicating that the wireless device is a candidate for using dedicated random access preambles, the information being received from the core network node; and
   determining whether to allocate the dedicated random access preamble to the wireless device based on the received information.

16. The radio network node according to claim 13, wherein the processing circuitry is configured to determine whether to allocate the dedicated random access preamble to the wireless device based on an availability of dedicated random access preambles in the cell.

17. The radio network node according to claim 13, wherein the indicator of the dedicated random access preamble indicates that the transmitted dedicated random access preamble or the dedicated random access preamble identified by the transmitted identifier is to be used by the wireless device for a random access procedure.

18. The radio network node according to claim 13, wherein the indicator of the dedicated random access preamble is the dedicated random access preamble itself or an identifier of the dedicated random access preamble.

19. The radio network node according to claim 13, wherein the processing circuitry is configured to transmit information related to the time window to the wireless device via the transmitter at least one of: prior to the determining of whether to allocate the dedicated random access preamble; and in the message related to the paging of the wireless device.

20. A wireless device configured for random access, the wireless device comprising:
   a receiver configured to receive signals; and
   processing circuitry configured to:
      receive, via the receiver, from a radio network node of a wireless communication system, an indicator of a dedicated random access preamble in a message related to a paging of the wireless device in a cell served by the radio network node, wherein the dedicated random access preamble or an identifier of the dedicated random access preamble is received from the radio network node prior to receiving the indicator of the dedicated random access preamble, wherein the dedicated random access preamble is valid for random access during a time window; and
      initiate a random access procedure with the radio network node using the dedicated random access preamble.

21. The wireless device according to claim 20, wherein the message related to the paging is at least one of the following:
   a paging message;
   a packet data unit carrying the paging message; and
   a message indicating a paging in the cell.

22. The wireless device according to claim 20, wherein the indicator of the dedicated random access preamble indicates that the received dedicated random access preamble or the dedicated random access preamble identified by the received identifier is to be used for the random access procedure.

23. The wireless device according to claim 20, wherein the indicator of the dedicated random access preamble is the dedicated random access preamble itself or an identifier of the dedicated random access preamble.

24. The wireless device according to claim 20, wherein the processing circuitry is configured to receive information related to the time window via the receiver from the radio network node at least one of:

prior to receiving the indicator of the dedicated random access preamble; and in the message related to the paging of the wireless device.

\* \* \* \* \*